(12) United States Patent
Dick et al.

(10) Patent No.: US 7,627,046 B1
(45) Date of Patent: Dec. 1, 2009

(54) WAVEFORM GENERATION FOR IMPROVED PEAK-TO-AVERAGE AMPLITUDE RATIO

(75) Inventors: Christopher H. Dick, San Jose, CA (US); Frederic J. Harris, San Diego, CA (US)

(73) Assignee: Xilinx, Inc., San Jose, CA (US)

( * ) Notice: Subject to any disclaimer, the term of this patent is extended or adjusted under 35 U.S.C. 154(b) by 587 days.

(21) Appl. No.: 11/119,004

(22) Filed: Apr. 29, 2005

(51) Int. Cl.
  *H04L 27/28* (2006.01)
(52) U.S. Cl. .................. 375/260; 375/219; 375/267; 375/296; 375/303; 370/206; 370/210; 455/450; 455/464; 455/509
(58) Field of Classification Search ............... 375/260, 375/296, 219–222, 226, 259, 265–267, 306, 375/293, 303, 355; 370/210, 222, 206, 220, 370/310, 329; 455/450, 464, 509
  See application file for complete search history.

(56) References Cited

U.S. PATENT DOCUMENTS 5,852,630 A * 12/1998 Langberg et al. ............ 375/219
7,391,815 B2 * 6/2008 Lakkis ....................... 375/260
2004/0218689 A1 * 11/2004 Akhtman ..................... 375/296
2005/0100108 A1 * 5/2005 Yun et al. .................... 375/260
2005/0169398 A1 * 8/2005 Magee et al. ................ 375/267
2005/0265479 A1 * 12/2005 Fujii et al. ................... 375/303
2007/0201353 A1 * 8/2007 Wight ........................ 370/210
2007/0291860 A1 * 12/2007 Wang et al. .................. 375/260

* cited by examiner

*Primary Examiner*—Shuwang Liu
*Assistant Examiner*—Hirdepal Singh
(74) *Attorney, Agent, or Firm*—W. Eric Webostad

(57) ABSTRACT

Method and apparatus for peak-to-amplitude ratio reduction are described. A data carrying signal waveform with sub-carrier signals (S1-1 through S1-M) is obtained. An initial peak reduction waveform (S2($m$)) is obtained by selection of a portion of the sub-carrier signals (S1-1 through S1-M) for non-data carrying. The initial peak reduction waveform (S2($m$)) is refined by at least one recursive iteration which combines the initial peak reduction waveform (S2($m$)) with a circularly time-shifted version thereof to obtain a resultant peak reduction waveform having a peak side lobe amplitude less than that of the initial peak reduction waveform (S2($m$)).

20 Claims, 6 Drawing Sheets

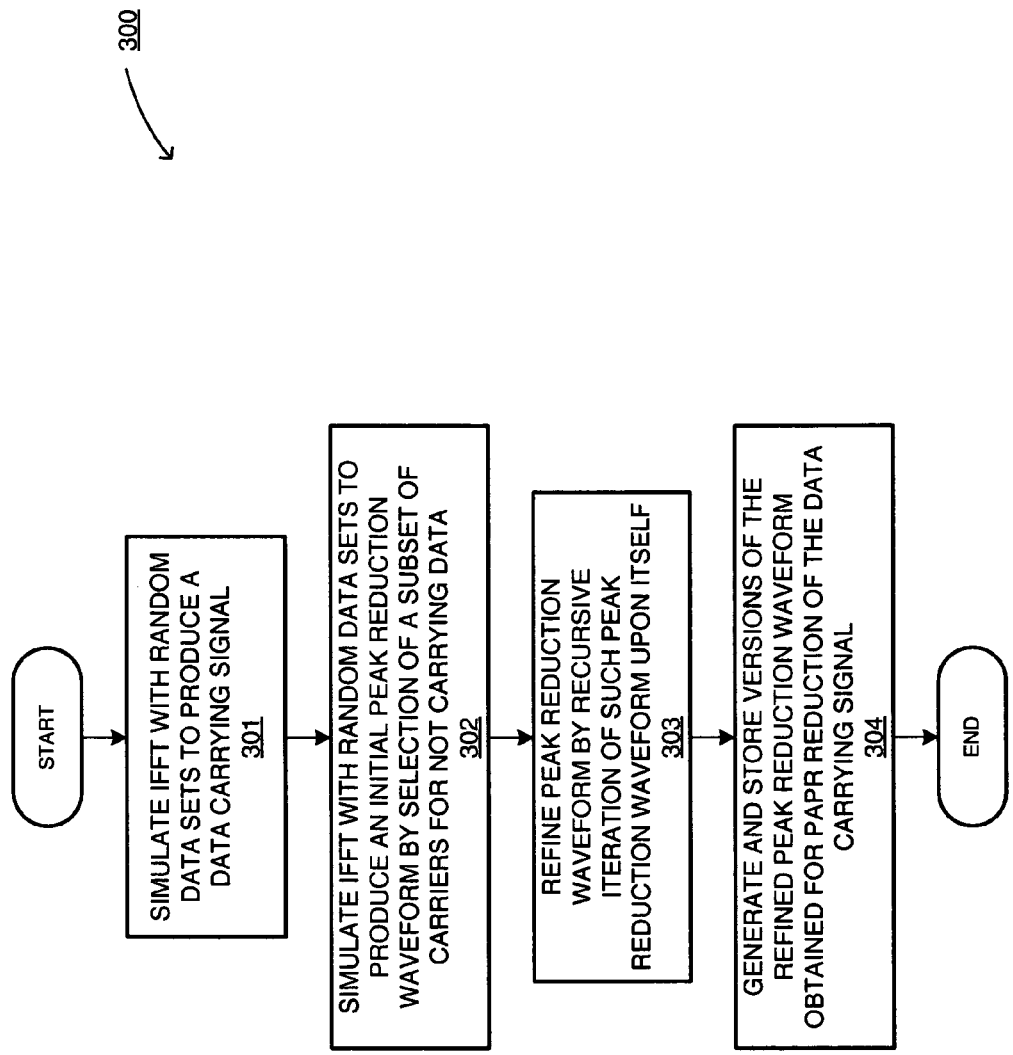

WAVEFORM GENERATION FOR IMPROVED PEAK-TO-AVERAGE AMPLITUDE RATIO

FIELD OF THE INVENTION

One or more aspects of the invention relate generally to communications and, more particularly, for enhancing peak-to-average amplitude ratio ("PAR") in communications using Orthogonal Frequency Division Multiplexing ("OFDM").

BACKGROUND OF THE INVENTION

Orthogonal Frequency Division Multiplexing ("OFDM") is a widely used signal multiplexing technique for communications, such as over-the-air ("wireless") communications. An OFDM modulated signal is assembled at a baseband frequency associated with a communications channel as a weighted sum of N complex sinusoids, where N is an integer larger than or equal to one. Each complex sinusoid has a duration of T seconds with a frequency separation of 1/T Hz. The resulting OFDM configured signal spans a combined band of frequencies of N/T Hz.

An OFDM modulator assembles the OFDM modulated signal by spectral translation, summing real and imaginary components of the N complex sinusoids. Weighting terms for this weighted sum are independent random selections of complex data points in a so-called "constellation set" for modulations of the OFDM modulated signal. This OFDM constellation set may be modulated by Quadrature Amplitude Modulation ("QAM").

Due to the additive summation of N sub-carriers to provide a weighted sum for QAM, relatively large peaks in the OFDM modulated signal may result, whether in a positive or negative direction. The average power of an OFDM modulated signal transmitted is maintained in a channel to obtain a threshold system error rate. The peak-to-average power ratio ("PAPR") is conventionally used to define a dynamic range to be accommodated by components in a signal flow path down stream from the OFDM modulator. Conventionally, a PAPR is used though a peak-to-average ratio of some other energy level, such as voltage level for example, may be used. Clipping of peaks has been used to reduce the PAPR, which reduces the dynamic range, and thus also reduces the expense and complexity of components. Moreover, clipping of excessive peaks, which may cause interference in other carrier signals such those near the baseband frequency of the OFDM modulated signal for example, may reduce possible interference. However, clipping causes signal loss, and thus may negatively impact error rate performance.

Accordingly, it would be desirable to modify a time envelope of a time domain signal formed by random QAM of spectral terms of an OFDM modulated signal to reduce the PAPR. Such modification should not modify the spectral terms, as that may introduce additive interference which negatively impacts error rate performance.

SUMMARY OF THE INVENTION

An aspect of the invention is a method for peak-to-amplitude ratio reduction. A data carrying signal waveform with sub-carrier signals is obtained. An initial peak reduction waveform is obtained by selection of a portion of the sub-carrier signals for non-data carrying. The initial peak reduction waveform is refined by at least one recursive iteration which combines the initial peak reduction waveform with a circularly time-shifted version thereof to obtain a resultant peak reduction waveform having a peak side lobe amplitude less than that of the initial peak reduction waveform.

Another aspect of the invention is a transmitter comprising an inverse fast fourier transform module coupled to receive an orthogonal frequency division multiplexing (OFDM) modulated signal. The orthogonal frequency division multiplexing modulated signal has frequency bins, a portion of which are reserved. The inverse fast fourier transform is configured to provide a superposition of the OFMD modulated signal as a discrete time series signal. A peak-to-amplitude ratio controller is coupled to receive the discrete time series signal. Waveform storage is coupled to the peak-to-amplitude ratio controller and has circularly time-shifted versions of a peak reducing waveform stored therein. The peak-to-amplitude ratio controller is configured to obtain a version of the circularly time-shifted versions of the peak reducing waveform for phase-alignment and combination with a peak of the discrete time series signal for peak-to-amplitude ratio reduction of the discrete time series signal. The circularly time-shifted versions of the peak reducing waveform are each obtained at least in part from an inverse fast fourier transform of a simulated signal associated with the orthogonal frequency division multiplexing modulated signal. The simulated signal has the portion of the frequency bins reserved. The circularly time-shifted versions of the peak reducing waveform are obtained by recursive iteration of the simulated signal including, combining an initial version of the simulated signal by a circularly time-shifted version thereof to obtain a resultant peak reducing waveform having a peak side lobe amplitude less than that of the initial version of the simulated signal. The resultant peak reducing waveform is circularly time-shifted to provide the versions of the peak reducing waveform.

Yet another aspect of the invention is a storage medium encoded with machine-readable computer program code. When executed by a processor, the machine-readable computer program code causes execution of the method for peak-to-amplitude ratio reduction as described above.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

FIG. 3 is a flow diagram depicting an exemplary embodiment of a peak-to-amplitude power ratio ("PAPR") reducing waveform generation flow.

To facilitate understanding, identical reference numerals have been used, where possible, to designate identical elements that are common to the figures.

DETAILED DESCRIPTION OF THE DRAWINGS

In the following description, numerous specific details are set forth to provide a more thorough description of the specific embodiments of the invention. It should be apparent, however, to one skilled in the art, that the invention may be practiced without all the specific details given below. In other instances, well known features have not been described in detail so as not to obscure the invention. For ease of illustration, the same number labels are used in different diagrams to refer to the same items; however, in alternative embodiments the items may be different.

Figure 1:
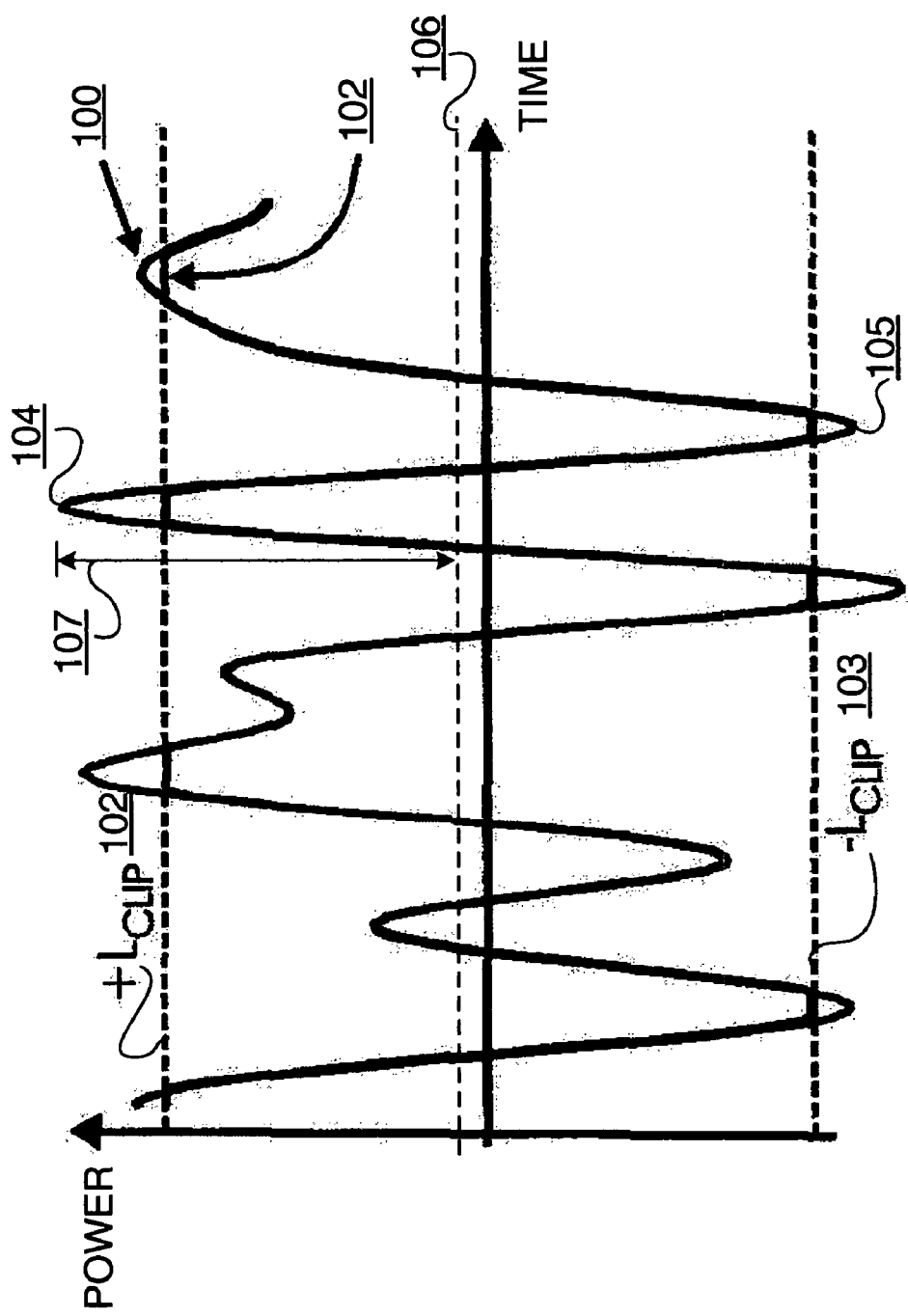
FIG. 1 is a signal diagram depicting an exemplary embodiment of an Orthogonal Frequency Division Multiplexing ("OFDM") modulated signal.

FIG. 1 is a signal diagram depicting an exemplary embodiment of an Orthogonal Frequency Division Multiplexing ("OFDM") modulated signal 100. OFDM modulated signal 100 has a positive amplitude peak power level ("positive peak") 104 and a negative amplitude peak power level ("negative peak") 105. Assuming that there are upper and lower thresholds within which peaks are to be confined in order to limit dynamic range, then such peaks may exceed such thresholds. For example, suppose positive peak 105 exceeds a positive control limit level ("+LCLIP") 102, and suppose negative peak 105 exceeds a negative control limit level ("−LCLIP") 103.

An average power level 106 for OFDM modulated signal 100 may be determined as is known. A peak-to-average power ratio ("PAPR") 107 may be quantified for OFDM modulated signal 100 using the power displacement from peaks, such as peaks 104 and 105, to average power level 106.

As described below in additional detail, OFDM modulated signal 100 is processed to adjust PAPR 107, without having to do clipping, such that positive and negative peaks 104 and 105 are within positive and negative threshold control limit levels 102 and 103.

Figure 2:
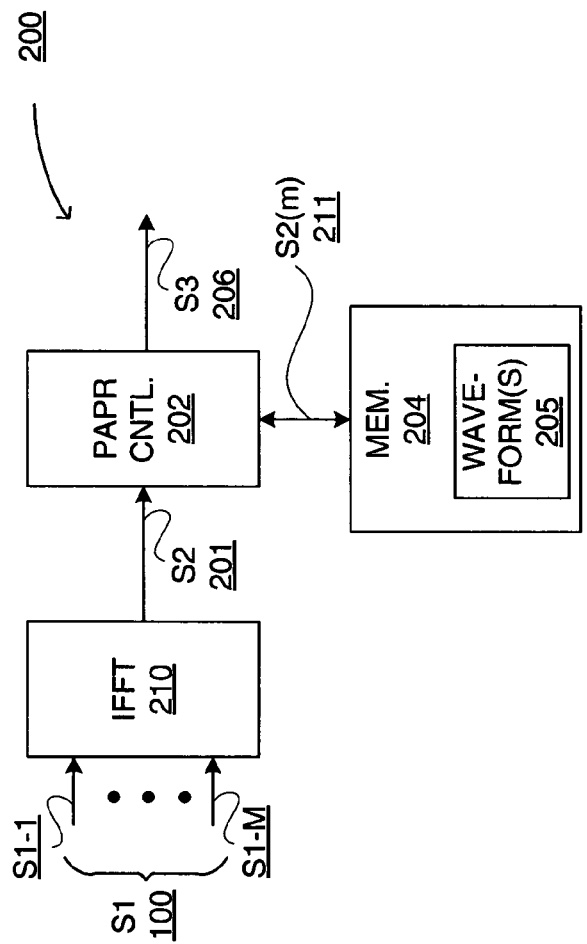
FIG. 2 is a block diagram of an exemplary embodiment of a communication device.

In FIG. 2, there is shown a block diagram of an exemplary embodiment of a communication device 200. Communication device 200 may be a transmitter, a transceiver, or other known communication device. Communication device 200 may provide an Inverse Fast Fourier Transform ("IFFT"). So for M sub-carriers of OFDM modulated signal ("S1") 100, where M is a positive integer, there are M input signals, namely S1-1 through S1-M, input to an IFFT block 210. Output of IFFT block 210 is a time series signal ("S2") 201 with discrete time samples spaced apart by some sample time.

For purposes of clarity, by way of example and not limitation, an example specifying variables, such as for example the number of sub-carriers and data points, is provided. However, it should be appreciated that values other than the example values may be used without departing from the scope of this disclosure. Suppose OFDM signal 100 is formed in this exemplary embodiment within an OFDM signal frame containing 401 frequency bins associated with sub-carriers for of 16-bit QAM data. A time series of such an OFDM signal frame may be formed by an N-point IFFT, where N is an integer greater than or equal to 2. In this embodiment N is equal to 1024, making the set sampling rate more than twice the spectral support needed for the 401 frequency bins as associated with sinusoidal sub-carrier signals. Alternative embodiments may use different numbers of data points N.

Thus, it should be understood that time series signal 201 for M equal to one would be a sinusoidal signal with discrete samples spaced apart by a sample time having the frequency of the input signal S1-1. If, however, M equals two, then time series signal 201 would be a sinusoidal signal with discrete samples spaced apart by a sample time where the resultant signal is the superposition of input signals S1-1 and S1-2 having a frequency that is twice the frequency of input signal S1-1. Thus, the general example for M inputs is S2 201 is a sinusoidal signal with discrete samples spaced apart by a sample time where the resultant signal is the superposition of input signals S1-1 through S1-M having a frequency that is M times the frequency of input signal S1-1. Signal S2 201 and S2($m$) 211 are provided to PAPR controller 202 to produce PAPR-adjusted signal ("S3") 206.

Accordingly, a portion of S1-M input signals may line up in phase such that amplitudes are additive, thus forming peaks in a superposition resultant waveform in excess of a threshold level, whether positive or negative. For example, it may be possible that all M input signals line up in phase such that all amplitudes are additive, thus forming a maximum peak, whether in a positive or negative direction. However, some number less than all M input signals may line up in phase to produce a peak in excess of a threshold.

FIG. 3 is a flow diagram depicting an exemplary embodiment of a PAPR-reducing waveform generation flow 300. Subsequent description is made with simultaneous reference to FIGS. 2 and 3.

Prior to transmission of OFDM modulated signal 100 to IFFT block 210, at 301 simulations of such transmission of OFDM modulated signal 100 with random data sets may be run to determine where such peaks may result in a data carrying waveform, such as a simulated version of S2 201. Such simulations may use a Monte Carlo simulation or other known simulation.

Figure 4:
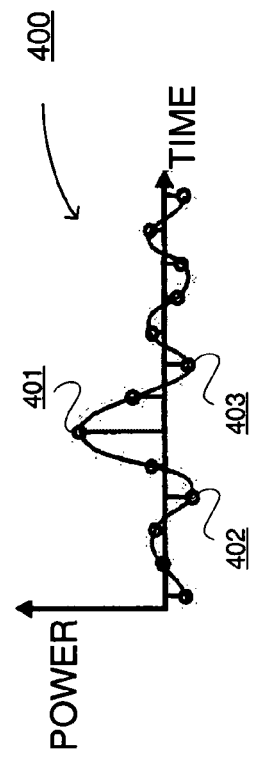
FIG. 4 is a signal diagram depicting an exemplary embodiment of an initial time series peak canceling waveform.

After generating a simulated version of S2 at 301, frequency bins from S1-1 through S1-M may be reserved to produce an initial time series peak reducing or canceling waveform. FIG. 4 is a signal diagram depicting an exemplary embodiment of such an initial time series peak canceling waveform ("S2($m$)") 400 where m denotes a subset of M, as described below in additional detail. S2($m$) 400 has a main peak 401 and secondary peaks 402 and 403.

With continuing reference to FIG. 4 and renewed reference to FIG. 2, the description of FIG. 3 is continued. It should be understood that memory 204 may be used to store a variety of versions of signal S2($m$) 211, which variety of versions are generally denoted as waveforms 205. Signal S2($m$) 400 may be one of the waveforms of waveforms 205, and thus may be signal S2($m$) 211. At 302, subsets of frequency bins, namely a subset of size m of signals S1-1 through S1-M for m a positive integer greater than zero, are selected for simulating an IFFT result, namely a discrete time series waveform S2($m$) 400 responsive to a portion of sub-carriers of an S1 signal 100. Input for such simulation may be random sets of data using a Monte Carlo or other known simulation to represent sub-carrier signals. Because m frequency bins carry no modulated data, this technique is referred to as "Tone Reservation." Notably, at 302, m frequency bins, which may be a subset of sub-carriers, may be identified to be reserved or otherwise pre-allocated for not carrying modulated data as determined by simulation with random sets of data. These m frequency bins are selected to provide a narrow pulse width signal, such as discrete time series waveform S2($m$) 400, having a primary peak with secondary and other lower order peaks with respect to the primary peak. For purposes of clarity, these lower order peaks are simply referred to hereinafter as "side lobes."

At 303, S2($m$) 400 is refined by recursive iteration to reduce the impact of side lobes. Notably, it should be understood that side lobes of a peak canceling waveform S2($m$) 400 may create other peaks in a PAPR-adjusted signal ("S3") 206.

These peaks may exceed a positive or negative threshold, and thus clipping may have to be employed. However, by reducing side lobes, their impact may be reduced. Moreover, such impact may be reduced to where clipping does not have to be used. Notably, the secondary side lobes may be targeted for reduction as they conventionally will be larger than lower order side lobes. However, generally the side lobe or lobes with the largest amplitude will be at least initially targeted for reducing their effect. Versions of S2($m$) 400 may be generated and stored at 304 for subsequent PAPR reduction of a data carry signal, such as S1 100.

Figure 5:
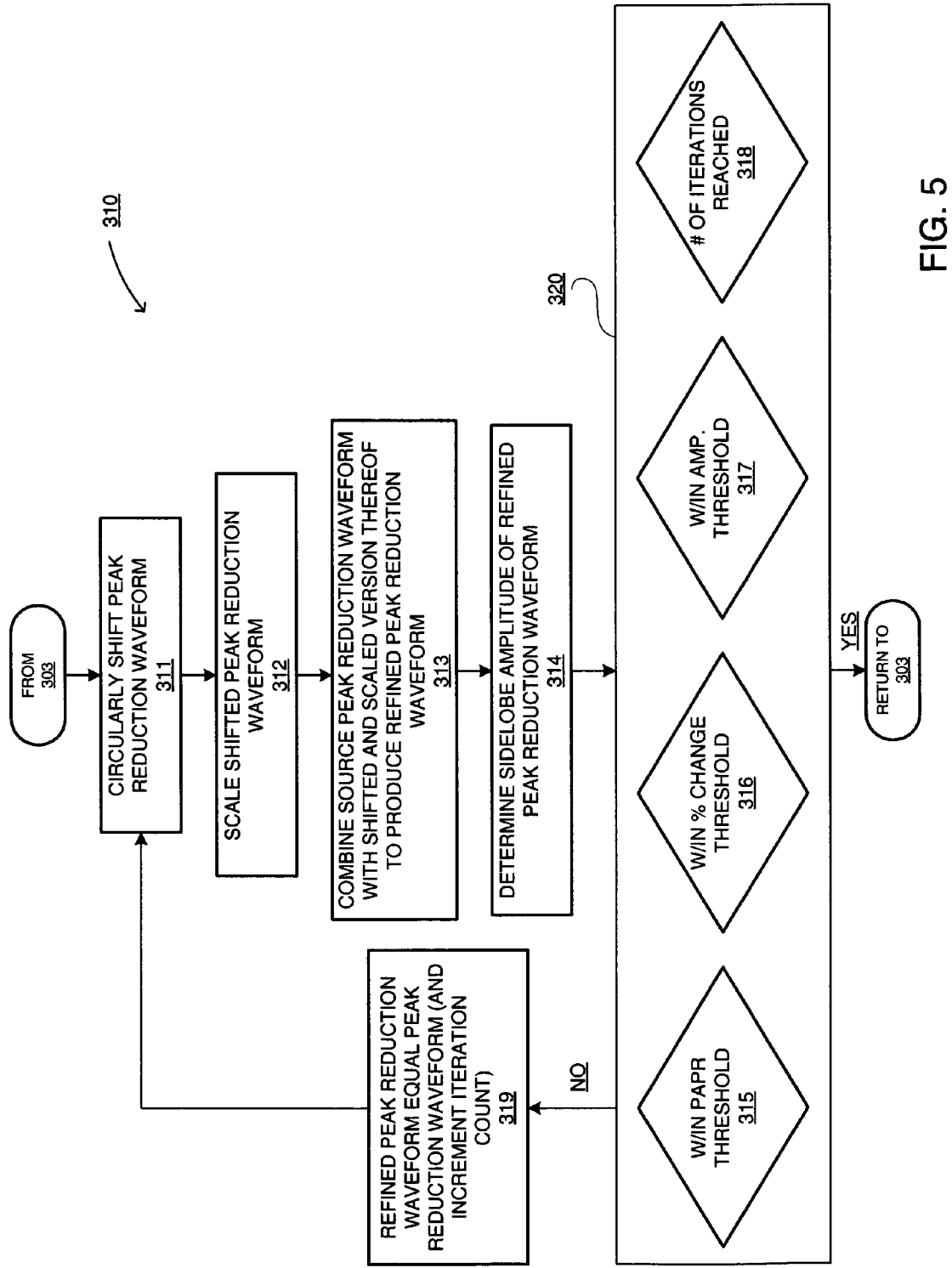
FIG. 5 is a flow diagram depicting an exemplary embodiment of a side lobe reduction flow.

FIG. 5 is a flow diagram depicting an exemplary embodiment of a side lobe reduction flow 310. From 303 of FIG. 3, at 311, S2($m$) 400 as simulated is obtained as an initial candidate for refinement. At 311, S2($m$) 400 is circularly shifted.

Figure 6:
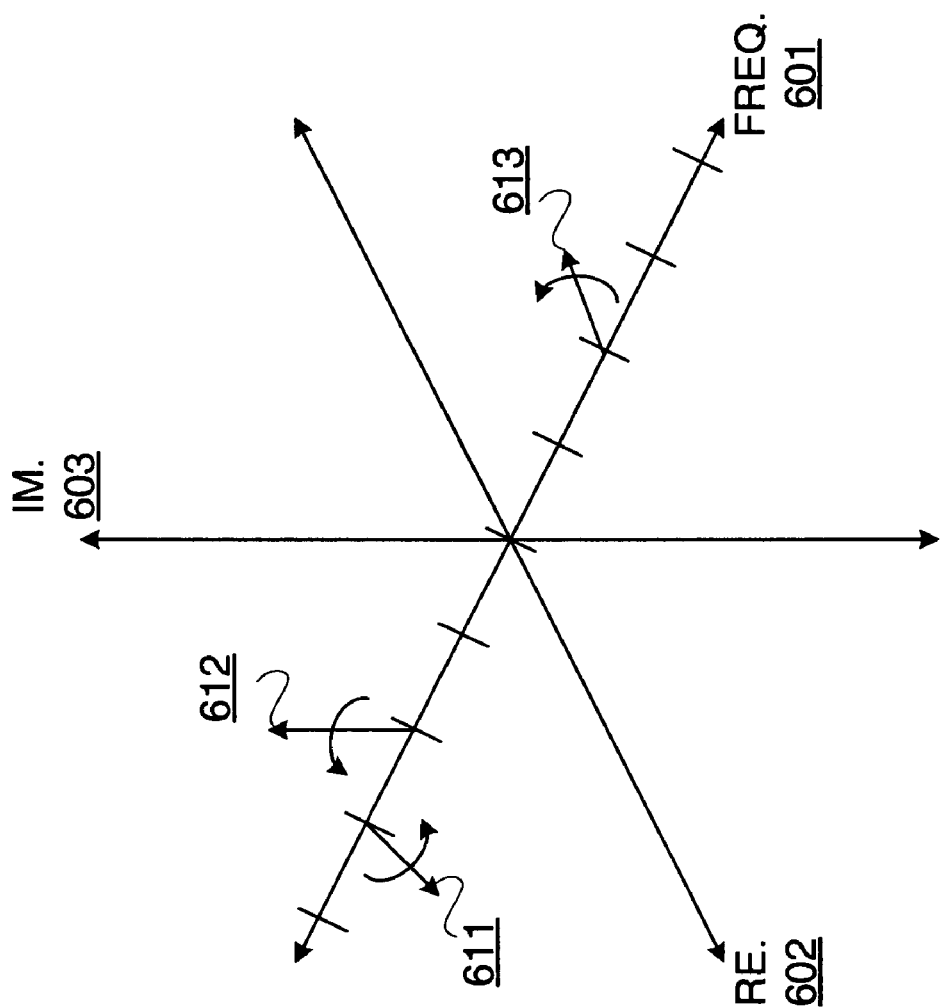
FIG. 6 is a graph of an exemplary embodiment of reserved sub-carrier bins.

To further understand circular shifting, reference is made to FIG. 6, where there is shown a graph of an exemplary embodiment of reserved frequency bins 611 through 613. S2($m$) 400 has both real and imaginary components as a complex or sinusoidal signal, as indicated with real axis 602 and imaginary axis 603. Selected frequency bins 611, 612, and 613 associated with Tone Reservation sub-carrier signals ("sub-carriers 611, 612, and 613") may be time shifted, and thus their relationship with respect to imaginary axis 603 may be changed. Accordingly, sub-carriers 611, 612, and 613 may be rotated to any of 360 degrees, namely, time shifted modulo 360 about frequency axis 601 for time shifting. This type of time shifting is a form of circular shifting. Moreover, selected sub-carriers 611, 612, and 613 may have their amplitude adjusted, and thus their relationship with respect to real axis 602 may be changed.

However, changes such as time shifting or amplitude scaling do not affect frequency of selected sub-carriers 611, 612, and 613 along frequency axis 601, and thus with respect to their spectral component there is no change in sub-carriers 611, 612, and 613. Accordingly, a receiver configured to receive such a PAPR-adjusted signal will have a priori knowledge of there being no modulated data on selected sub-carriers.

Returning to FIG. 5, at 311, S2($m$) is circularly shifted. Substituting $S_i$ for i a positive integer indicating an iteration, a circular time shift of T may be mathematically represented as:

$$S_i(m-T). \quad (1)$$

At 312, the circularly shifted signal provided at 311 may be amplitude scaled. Thus, for a scaling factor k, which may reflect a difference in power between a primary peak of S2($m$) and a next highest peak of S2($m$), an amplitude scaled and time shifted signal may be mathematically represented as:

$$(-k)S_i(m-T). \quad (2)$$

At 313, a source S2($m$) signal for an iteration is combined with a modified version thereof to provide a refined peak canceling waveform. In other words, a peak canceling waveform is recursively modified upon itself to provide an enhanced peak canceling waveform, namely a peak canceling waveform with a smaller side lobe peak amplitude than a source peak canceling waveform. Continuing the above example, this recursive combining may be mathematically represented as:

$$S_{i+1}(m)=S_i(m)+(-k)S_i(m-T). \quad (3)$$

At 314, side lobe amplitude, such as of the currently greatest side lobe amplitude, of the refined peak reduction waveform, namely $S_{i+1}(m)$, is determined. After determining side lobe amplitude, one or more decision criteria 320 may be employed.

At 315, it may be determined whether $S_{i+1}(m)$ side lobe amplitude is sufficiently reduced such that PAPR is within a target range or threshold. If $S_{i+1}(m)$ side lobe amplitude is within such a target range or threshold, then side lobe reduction flow 310 may return to 303 of FIG. 3.

At 316, it may be determined whether $S_{i+1}(m)$ side lobe amplitude percent change is less than a threshold amount. If $S_{i+1}(m)$ side lobe amplitude has not changed more than or equal to such a threshold, then side lobe reduction flow 310 may return to 303 of FIG. 3.

At 317, it may be determined whether $S_{i+1}(m)$ side lobe amplitude is itself within a target range or threshold. If $S_{i+1}(m)$ side lobe amplitude is within such a target range or threshold, then side lobe reduction flow 310 may return to 303 of FIG. 3.

At 318, it may be determined whether a threshold number of iterations have been performed. If the number of iterations equals a threshold iteration value, then side lobe reduction flow 310 may return to 303 of FIG. 3.

Notably, operations 315 through 318 are not mutually exclusive of one another, nor do all such operations need to be performed. Accordingly, it should be appreciated that these are merely examples of one or more criteria that may be used in an exemplary implementation.

If one or more criteria for returning to 303 of FIG. 3 are not met, then an increment counter may be incremented at 319, and $S_i(m)$ may be set to equal $S_{i+1}(m)$ for a subsequent iteration.

Accordingly, at this juncture it should be appreciated that an initial peak canceling wave form S2($m$) is recursively modified using such waveform as the basis for such recursion. This recursion is employed to provide a revised version of S2($m$) which has a more impulse or impulse-like profile than the initial peak canceling waveform.

Returning to FIG. 2 to more clearly understand an application of refined versions thereof of S2($m$), M sub-carriers may be input to IFFT 200. Of these M sub-carriers of S1 100, only M minus m sub-carriers may have modulated data, where one or more reserved frequencies carry no modulated data. These M sub-carriers S1-1 through S1-M of OFDM modulated signal 100 are processed by IFFT block 210 to provide time series waveform signal 201.

Time series signal 201 may be input to a PAPR controller 202. PAPR controller 202 may be coupled to storage, such as memory 204, having stored therein one or more versions 205 of a peak canceling waveform S2($m$), namely a recursively obtained time series waveform $S_{i+1}(m)$. Known PAPR controllers may be used, and thus PAPR controller 202 is not described in unnecessary detail for purposes of clarity.

In an application, a peak canceling waveform is applied to a data bearing time series signal S2 201 by PAPR controller 202 to phase align peaks to reduce PAPR. Accordingly, there may be multiple peaks located at different sampling times in a data bearing time series signal S2 201. Furthermore, such peaks may extend either in a positive or negative direction. Thus, a peak canceling waveform may be subtracted or added to reduce PAPR. Having simulated data bearing signal 201, locations and directions of such peaks may be known a priori to actual transmission.

Accordingly, circularly shifted versions of peak canceling waveform $S_{i+1}(m)$, namely $S_{i+1}(m-t)$ for t any sample time location of a circular time shift, may be stored in memory 204. Thus, peak canceling waveform versions 205 may be the same waveform though for different sample time locations responsive to data bearing time series signal S2 201. Again, this time shifting employs circular invariance of an IFFT. Thus, such peak canceling waveform versions 205 may be respectively accessed and phase aligned to respective peaks of time series signal S2 201 to reduce the PAPR.

PAPR controller 202 may be configured to access from memory 204 one or more peak canceling waveform S2($m$) variations to phase align the respective primary peaks thereof to reduce PAPR of time series signal 201 to output time series signal S3 206 where time series signal 206 has a lower PAPR than time series signal 201. Such peak cancelling waveform S2($m$) accessed may be added to or subtracted from a data carrying signal waveform without introducing spectral distortion of the data carrying signal waveform.

Figure 7:
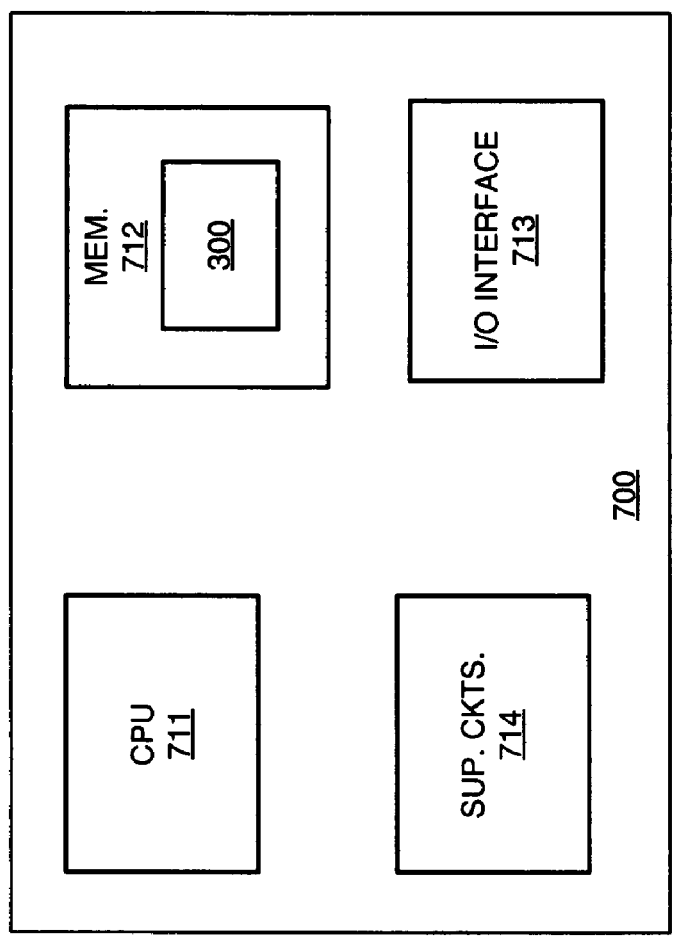
FIG. 7 is a high-level block diagram of an exemplary embodiment of a programmed computer.

FIG. 7 is a high-level block diagram of an exemplary embodiment of a programmed computer 700. Programmed computer 700 includes a central processing unit ("CPU") 711, memory 712, a variety of support circuits 714, and an input/output ("I/O") interface 713. Notably, as used herein, the words "include" and "including" mean including without limitation. CPU 711 may be any type of microprocessor known in the art. Support circuits 714 for CPU 711 include conventional cache, power supplies, clock circuits, data registers, I/O interfaces, and the like. Memory 712 may be directly coupled to CPU 711 or coupled through I/O interface 713, and I/O interface 713 may be coupled to a conventional keyboard, network, mouse, display printer, and interface circuitry adapted to receive and transmit data, such as data files and the like.

Memory 712 may store all or portions of one or more programs or data to implement processes, including PAPR-reducing waveform generation flow 300 and associated data for it. Additionally, those skilled in the art will appreciate that one or more aspects disclosed herein may be implemented in hardware, software, or a combination of hardware and software. Such implementations may include a number of processors independently executing various programs and dedicated hardware or programmable hardware.

Programmed computer 700 may be programmed with an operating system, which may be OS/2, Java Virtual Machine, Linux, Solaris, Unix, or Windows operating system, among other known platforms. At least a portion of an operating system may be disposed in memory 712. Memory 712 may include one or more of the following: random access memory, read only memory, magneto-resistive read/write memory, optical read/write memory, cache memory, magnetic read/write memory, and the like, as well as signal-bearing media as described below.

Program(s) of the program product defines functions of embodiments in accordance with one or more aspects disclosed herein and can be contained on a variety of signal-bearing media, such as computer-readable media having code, which include, but are not limited to: (i) information stored on writable storage media (e.g., read-only and random access memory devices, such as CDs, DVDs, memory sticks, memory cards, floppy disks, hard, and disk drives, among others) readable by a device capable of reading such information stored for use by a computer; or (ii) information conveyed to a computer by a communications medium, such as through a computer or telephone network, including wireless communications. The latter embodiment specifically includes information downloaded from the Internet and other networks. Such signal-bearing media, when carrying computer-readable instructions that direct functions of one or more aspects disclosed herein, are within the scope of this disclosure.

While the foregoing describes exemplary embodiment(s) in accordance with one or more aspects of the invention, other and further embodiment(s) in accordance with the one or more aspects of the invention may be devised without departing from the scope thereof, which is determined by the claim(s) that follow and equivalents thereof. Claim(s) listing steps do not imply any order of the steps. Trademarks are the property of their respective owners.

What is claimed is:

1. A method for side lobe amplitude reduction, comprising:
   obtaining a data carrying signal waveform, the data carrying signal waveform having sub-carrier signals;
   obtaining an initial peak reduction waveform, the initial peak reduction waveform obtained by selection of a portion of the sub-carrier signals for non-data carrying;
   wherein the initial peak reduction waveform is obtained from reserved frequency bins with respect to an Inverse Fast Fourier Transform;
   wherein the initial peak reduction waveform is orthogonal to the data carrying signal waveform; and
   refining the initial peak reduction waveform by at least one recursive iteration, the recursive iteration including,
      combining the initial peak reduction waveform with a circularly time-shifted version thereof to obtain a resultant peak reduction waveform having a peak side lobe amplitude less than that of the initial peak reduction waveform;
      wherein the side lobe amplitude is reduced to enhance a peak-to-side lobe amplitude ratio such that the resultant peak reduction waveform has a more impulse or impulse-like profile than the initial peak reduction waveform.

2. The method, according to claim 1, wherein the refining further comprises scaling the circularly time-shifted version of the initial peak waveform.

3. The method, according to claim 2, further comprising:
   applying the resultant peak reduction waveform to the data carrying signal waveform for peak reduction; and
   determining whether a peak-to-amplitude power ratio for the data carrying signal waveform is less than a threshold level therefor.

4. The method, according to claim 2, further comprising determining whether the peak side lobe amplitude has changed at least a threshold percentage.

5. The method, according to claim 2, further comprising determining whether the peak side lobe amplitude is within a threshold range therefor.

6. The method, according to claim 2, further comprising:
   setting the resultant peak reduction waveform to be the initial peak reduction waveform; and
   repeating the refining.

7. The method, according to claim 1, further comprising:
   generating other versions of the resultant peak reduction waveform by circular time shifts of the resultant peak reduction waveform; and
   storing the other versions of the resultant peak reduction waveform for subsequent phase alignment of a respective version of the other versions of the resultant peak reduction waveform to a peak of the data carrying signal waveform.

8. The method, according to claim 7, further comprising adding the respective version of the other versions of the resultant peak reduction waveform to the data carrying signal waveform without introducing spectral distortion of the data carrying signal waveform.

9. The method, according to claim 7, further comprising subtracting the respective version of the other versions of the resultant peak reduction waveform to the data carrying signal waveform without introducing spectral distortion of the data carrying signal waveform.

10. The method, according to claim 1, wherein the data carrying signal waveform is a discrete time series.

11. The method, according to claim 1, wherein the data carrying signal waveform is an Orthogonal Frequency Division Multiplexing modulated signal.

12. The method, according to claim 11, wherein the data carrying signal waveform is modulated with Quadrature Amplitude Modulation.

13. A transmitter, comprising:
an Inverse Fast Fourier Transform ("IFFT") module coupled to receive an orthogonal frequency division multiplexing ("OFDM") modulated signal, the OFDM modulated signal having frequency bins;
a portion of the frequency bins being reserved;
the IFFT module configured to provide a superposition of the OFMD modulated signal as a discrete time series signal;
a peak-to-amplitude ratio controller coupled to receive the discrete time series signal;
waveform storage coupled to the peak-to-amplitude ratio controller, the waveform storage having circularly time-shifted versions of a peak reducing waveform stored therein;
the peak-to-amplitude ratio controller configured to obtain a version of the circularly time-shifted versions of the peak reducing waveform for phase-alignment and combination with a peak of the discrete time series signal for peak-to-amplitude ratio reduction of the discrete time series signal;
the circularly time-shifted versions of the peak reducing waveform each obtained at least in part from an IFFT of a simulated signal associated with the OFDM modulated signal;
the simulated signal having the portion of the frequency bins being reserved, the circularly time-shifted versions of the peak reducing waveform being obtained by recursive iteration of the simulated signal including,
combining an initial version of the simulated signal with a circularly time-shifted version thereof to obtain a resultant peak reducing waveform having a peak side lobe amplitude less than that of the initial version of the simulated signal;
wherein the resultant peak reducing waveform is obtained using the frequency bins reserved with respect to the IFFT;
wherein the resultant peak reducing waveform is orthogonal to the discrete time series signal; and
circularly time-shifting the resultant peak reducing waveform to provide the versions of the peak reducing waveform;
wherein the peak side lobe amplitude of the initial version of the simulated signal is reduced to enhance a peak-to-side lobe amplitude ratio such that the resultant peak reducing waveform has a more impulse or impulse-like profile than the initial version of the simulated signal.

14. The transmitter, according to claim 13, wherein the recursive iteration of the simulated signal further includes scaling the initial version of the simulated signal for the combining.

15. The transmitter, according to claim 13, wherein the portion of the frequency bins reserved are reserved for non-data carrying.

16. The transmitter, according to claim 15, wherein the frequency bins are sub-carrier signals, each of the sub-carrier signals having a unique discrete frequency with respect to a communication channel.

17. The transmitter, according to claim 16, wherein the communication channel operates at a baseband frequency, the baseband frequency being associated with a carrier signal for the sub-carrier signals.

18. The transmitter, according to claim 13, wherein the peak-to-amplitude ratio reduction is for power reduction.

19. The transmitter, according to claim 13 wherein the peak-to-amplitude ratio reduction is for voltage reduction.

20. A storage medium encoded with machine-readable computer program code, which when executed by a processor, causes execution of a method for side lobe amplitude reduction, the method comprising:
obtaining a data carrying signal waveform, the data carrying signal waveform having sub-carrier signals;
obtaining an initial peak reduction waveform, the initial peak reduction waveform obtained by selection of a portion of the sub-carrier signals for non-data carrying;
wherein the initial peak reduction waveform is obtained from reserved frequency bins with respect to an Inverse Fast Fourier Transform;
wherein the initial peak reduction waveform is orthogonal to the data carrying signal waveform; and
refining the initial peak reduction waveform by at least one recursive iteration, the recursive iteration including,
combining the initial peak reduction waveform with a circularly time-shifted version thereof to obtain a resultant peak reduction waveform having a peak side lobe amplitude less than that of the initial peak reduction waveform;
wherein the side lobe amplitude is reduced to enhance a peak-to-side lobe amplitude ratio such that the resultant peak reduction waveform has a more impulse or impulse-like profile than the initial peak reduction waveform.

* * * * *

UNITED STATES PATENT AND TRADEMARK OFFICE
CERTIFICATE OF CORRECTION

PATENT NO. : 7,627,046 B1  Page 1 of 1
APPLICATION NO. : 11/119004
DATED : December 1, 2009
INVENTOR(S) : Dick et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 812 days.

Signed and Sealed this

Second Day of November, 2010

David J. Kappos
*Director of the United States Patent and Trademark Office*